Patented Oct. 24, 1933

1,932,131

UNITED STATES PATENT OFFICE 1,932,131

ISOLATION OR PURIFICATION OF MENTHOLS

John William Blagden and Walter Edward Huggett, Ilford, England, assignors of one-third to Howards & Sons, Limited, Ilford, England, a British company No Drawing. Application April 5, 1932, Serial No. 603,440, and in Great Britain April 10, 1931

10 Claims. (Cl. 260—153)

In United States patent application Serial No. 594,960 filed 24th February 1932, we have shown that the isomeric menthols (that is inactive menthol, its stereoisomers, such as inactive isomenthol and neomenthol, and the various optically active forms of these substances) form well-defined, crystalline compounds, with ortho-phosphoric acid. These new compounds have properties which vary according to the isomeric menthol from which they are prepared; for example, the phosphoric acid compounds of racemic neomenthol and of racemic menthol are much less soluble in petroleum ether than the phosphoric acid compound of racemic isomenthol.

The present invention consists in the application of the capacity of the isomeric menthols for forming these crystalline phosphoric acid compounds of differing properties to the separation of menthol (whether optically active or optically inactive) and stereoisomers thereof from their mixtures with one another or with other substances. For this purpose, the isomeric menthol or menthols in the mixture is or are converted by treatment with orthophosphoric acid wholly or partially into the crystalline phosphoric acid compound or compounds of the kind described in the aforesaid specification, and the isolated crystalline product is decomposed into its constituents, if required after it has been purified, for example by recrystallization.

When the parent mixture contains, in addition to menthol or a stereoisomer thereof, no other substance which under the conditions of the treatment is solid or forms a crystalline compound with phosphoric acid, the isolated crystalline product may, if desired, be decomposed directly; in the case of mixtures containing two or more isomeric menthols, the crystalline product is conveniently purified by re-crystallization before it is decomposed.

The phosphoric acid may be used in quantity sufficient for converting the whole of the isomeric menthol or menthols in the mixture into the crystalline phosphoric acid compound, or in quantity insufficient for this purpose. In the case of mixtures containing two or more isomeric menthols, the use of a quantity of phosphoric acid insufficient for converting the whole of the menthols into phosphoric acid compounds may result in a more or less selective reaction with one of the menthols and lead to a crystalline product which yields directly on decomposition a menthol or stereoisomer thereof of good purity; purification of the crystalline product by known methods before decomposition is not, however, excluded.

The process may be repeated once or more than once; that is to say, the purified menthol or stereoisomer thereof obtained by treatment with ortho-phosphoric acid in accordance with the invention may be subjected to a further purification by treatment with ortho-phosphoric acid, and so on. In this manner, it is possible to separate from one another any two or more of the isomeric menthols.

The invention may be combined with any suitable known methods of purification. For example, it may be used in conjunction with a process of the kind described in British Patent No. 297,019 which process may precede or follow the phosphoric acid treatment in accordance with the invention. Other known methods of purification which may be used in conjunction with the invention are recrystallization, fractional distillation, fractional steam distillation and the like, and these methods may be applied, where appropriate, to the mixture which is to be treated with phosphoric acid, or to a partially purified product obtained by the phosphoric acid treatment, or, when the phosphoric acid treatment is preceded or followed by a process of the kind described in British Patent specification No. 297,019 to the esters of the menthols produced in the course of that process.

The invention is applicable with advantage to the manufacture of purified inactive menthol from the crude or partially purified mixtures of isomeric menthols which are obtained by the hydrogenation of compounds such as thymol, menthones, menthenols, or menthenones, or by isomerization of these mixtures, for example by the process described in British Patent No. 213,991 and U. S. Patents Nos. 1,811,711 and 1,811,777.

For example, the crude or partially purified hydrogenation or isomerization product may be treated by one of the processes described in British Patent No. 297,019 to remove the whole or greater part of the neomenthol, and the product thus obtained may be treated by the process of the invention to remove isomenthol and any residual neomenthol and to yield a purified inactive menthol. Or the crude or partially purified hydrogenation or isomerization product may first be treated by the process of the invention to remove isomenthol and the product thus obtained freed from neomenthol by one of the processes described in British Patent No. 297,019.

The stereoisomers of menthol may be recovered and again subjected to the process of the invention, with or without treatment in any known manner to convert them partially into inactive menthol.

The invention is also applicable with advantage to the isolation or purification of optically active menthol; for example, it forms a convenient method for the isolation of laevo-menthol from peppermint oil.

The following examples illustrate the invention, the parts being by weight:—

1. A mixture of isomeric menthols obtained from a partially purified product of the hydrogenation of piperitone and consisting mainly of racemic menthol and racemic isomenthol has the following boiling range:—

| | Per cent |
|---|---|
| 216–217° C | 65 |
| 217–218° C | 25 |
| Over 218° C | 10 |

220 parts of this mixture (an oil melting at 15° C.) are mixed at ordinary temperature with 52.5 parts of ortho-phosphoric acid of 89 per cent. strength (specific gravity 1.75) whereby the whole sets to a solid mass. 200 parts of petroleum ether are then added and the whole gently warmed until the solid has passed into solution. The water originally present in the phosphoric acid separates and is removed, and the petroleum ether solution is allowed to cool. A portion of the menthol-phosphoric acid compound crystallizes from this solution at ordinary temperature and is separated from it in the usual way. It may be decomposed into its components by heating it alone, preferably in a vacuum, in which case the menthol distils, or by heating it with water, in which case the menthol is conveniently separated by steam distillation. It has the following boiling range:—

| | Per cent |
|---|---|
| 216–217° C | 99 |
| 217–217.3° C | 1 |

This product may be treated again with phosphoric acid in the manner above described and then yields a product boiling entirely between 216.5° C. and 216.6° C.

2. The product of hydrogenation of piperitone is an oil having the following boiling range:—

| | Per cent |
|---|---|
| 214.7–215.5° C | 18 |
| 215.5–216.5° C | 57 |
| 216.5–217.5° C | 18 |
| 217.5–218.5° C | 7 |

100 parts of this oil are treated with 24 parts of ortho-phosphoric acid of specific gravity 1.75 and 70 parts of petroleum ether; on standing crystals separate. These crystals yield on decomposition with water 50 parts of menthol which, when distilled, is found to have a boiling range of:—

| | Per cent |
|---|---|
| 214.7–215.5° C | 49 |
| 215.5–216.5° C | 51 |

By cooling the distillate, for example, to about 5° C., seeding it, if necessary with racemic menthol and centrifuging the separated crystals, a racemic menthol of good purity is obtained.

3. A mixture of isomeric menthols having the following boiling range—

| | Per cent |
|---|---|
| 212.3–213° C | 32 |
| 213–213.7° C | 68 | obtained in the partial purification of the product of hydrogenation and isomerization of piperitone by the process of British specification 297,019 and representing the less readily esterifiable portion of the product, is treated with ortho-phosphoric acid in the manner described in Example 2.

There is obtained a phosphoric acid compound wihch melts at 85° C. and, when decomposed into its constituents, yields a neomenthol of melting point 46° C. The phosphoric acid compound may be re-crystallized from benzene and then has a melting point of 86° C.; when this purified compound is decomposed it yields a neomenthol having a melting point of 53° C.

4. 100 parts of Japanese peppermint oil are mixed at ordinary temperature with 21 parts of ortho-phosphoric acid of specific gravity 1.75. There is obtained a viscous liquid mixture, which is preferably warmed to 40° C. to facilitate separation of excess acid and water; there remains a homogeneous liquid, which is allowed to stand for several hours at ordinary temperature, during which time crystals of the new product of menthol and phosphoric acid separate. The crystals are removed and decomposed with water, yielding 45 parts of laevo-menthol of melting point 43° C. and specific rotation α[D]=−52°.

As already indicated, the process of the invention may be combined with other known methods of purification such as fractional esterification, or esterification followed by fractional saponification; this procedure is illustrated by the folowing example:—

5. 60 parts of the product having a boiling range of 216–217° C. obtained as described in Example 1, or of the product having a boiling range of 214.7–216.5° C. obtained as described in Example 2, are heated for 10 minutes at 180–200° C. with 40 parts of phthalic anhydride. The unchanged menthol is then removed by steam distillation after addition of sodium carbonate to convert the acid phthalate in the reaction mixture into the sodium salt, which remains unchanged. After removal of the unchanged menthol, the acid phthalate is reprecipitated by acidification of the liquid and may be separated and recrystallized frem benzene. When saponified, it yields a racemic menthol of good purity.

It is to be understood that the term "catalytic hydrogenation products" is used in the appended claims to include not only the crude products obtained directly by the hydrogenation but also the products obtained from the crude product by isomerization or/and partial purification, for example by cooling the product and recovering the crystals which form.

The term "a menthol" used in the following claims is to be understood to include all the isomeric menthols, namely, racemic menthol (the racemate corresponding with the naturally occurring leavo-menthol) and its stereoisomers, as well as the corresponding optically active forms of these substances.

Having thus fully described the nature of the said invention and the best means we know of carrying the same into practical effect, what we claim as our invention is:—

1. A process for separating a menthol from a mixture containing it, which comprises treating the mixture with ortho-phosphoric acid so as to form a phosphoric acid addition compound of the menthol, separating the addition compound and decomposing it into its constituents.

2. A process for separating a menthol from a mixture containing it, which comprises treating the mixture with ortho-phosphoric acid so as to form a phosphoric acid addition compound of the menthol, separating the addition compound, subjecting it to purification and decomposing the purified addition compound into its constituents.

3. A process for separating a menthol contained in a mixture comprising at least two isomeric menthols, which comprises treating the mixture with ortho-phosphoric acid substantially in proportion sufficient to form a phosphoric acid addition product with one of the menthols contained in the mixture, whilst leaving the remainder of the menthol content unattached, separating the phosphoric acid addition product, purifying it and decomposing the purified product into its constituents.

4. A process for isolating racemic menthol from the catalytic hydrogenation products of compounds containing the menthol nucleus but having a smaller proportion of hydrogen to carbon than has menthol, which comprises treating the hydrogenation product with ortho-phosphoric acid to form phosphoric acid addition compounds with the isomeric menthols in the product, isolating a mixture of the phosphoric acid addition compounds of menthol and neomenthol, decomposing the isolated addition compounds, recovering the liberated isomeric menthols, subjecting the liberated isomeric menthols to partial esterification so as to effect a substantially selective esterification of the menthol, separating the esterification product from the unesterified material, subjecting the product to hydrolysis and recovering the liberated menthol.

5. A process for isolating racemic menthol from the catalytic hydrogenation products of compounds containing the menthol nucleus but having a smaller proportion of hydrogen to carbon than has menthol, which comprises subjecting the hydrogenation product to partial esterification, separating the esterification product from the unesterified material, decomposing the esterification product, recovering the liberated mixture of isomeric menthols, treating the mixture with ortho-phosphoric acid so as to form phosphoric acid addition compounds of the menthols, isolating the addition compound of menthol and decomposing it into its constituents.

6. A process for isolating racemic menthol from the catalytic hydrogenation products of compounds containing the menthol nucleus but having a smaller proportion of hydrogen to carbon than has menthol, which comprises treating the hydrogenation product with ortho-phosphoric acid to form phosphoric acid addition compounds with the isomeric menthols in the product, isolating a mixture of the phosphoric acid addition compounds of menthol and neomenthol, decomposing the isolated addition compounds, recovering the liberated isomeric menthols, esterifying the liberated isomeric menthols, partially hydrolyzing the esterification product so as to effect a selective hydrolysis of the menthol and recovering the liberated menthol.

7. A process for isolating racemic menthol from the catalytic hydrogenation products of compounds containing the menthol nucleus but having a smaller proportion of hydrogen to carbon than has menthol, which comprises subjecting the hydrogenation product to esterification, recrystallizing the esterification product, partially hydrolyzing the recrystallized product so as to effect a substantially selective hydrolysis of the esters of menthol and isomenthol, recovering the liberated isomeric menthols, treating the liberated menthols with ortho-phosphoric acid so as to form phosphoric acid addition compounds of the menthols, isolating the addition compound of menthol and decomposing it into its constituents.

8. A process of isolating laevo-menthol from peppermint oil, which comprises treating the oil with ortho-phosphoric acid so as to form the phosphoric acid addition compound of laevo-menthol, separating this compound and decomposing it into its constituents.

9. A process for separating racemic menthol from a mixture containing it, which comprises treating the mixture with ortho-phosphoric acid so as to form a phosphoric acid addition compound of the menthol, separating the addition compound and decomposing it into its constituents.

10. A process for separating racemic menthol from a mixture containing it, which comprises treating the mixture with ortho-phosphoric acid so as to form a phosphoric acid addition compound of the menthol, separating the addition compound, subjecting it to purification and decomposing the purified addition compound into its constituents.

JOHN WILLIAM BLAGDEN. [L. S.]
WALTER EDWARD HUGGETT. [L. S.]